United States Patent [19]

Roth et al.

[11] 4,394,335

[45] Jul. 19, 1983

[54] PROCESS FOR PREPARING STRUCTURAL COMPONENTS

[75] Inventors: Michael Roth; Volker Frey, both of Burghausen, Fed. Rep. of Germany

[73] Assignee: Wacker-Chemie GmbH, Munich, Fed. Rep. of Germany

[21] Appl. No.: 322,038

[22] Filed: Nov. 12, 1981

[30] Foreign Application Priority Data

Nov. 28, 1980 [DE] Fed. Rep. of Germany ....... 3044948

[51] Int. Cl.³ .............................................. C04B 7/02
[52] U.S. Cl. ........................................ 264/82; 106/89; 264/333
[58] Field of Search ..................... 264/333, 82; 106/89

[56] References Cited

U.S. PATENT DOCUMENTS

| 3,972,969 | 8/1976 | Rio | 264/42 |
| 4,002,713 | 1/1977 | Duncan | 264/333 |
| 4,043,826 | 8/1977 | Hum | 264/333 |

FOREIGN PATENT DOCUMENTS

3004346 8/1980 Fed. Rep. of Germany .

OTHER PUBLICATIONS

Kookootsedes, "Use of Silicones in Producing Moldable Precision Ceramics", *Ceramic Bulletin*, vol. 51, No. 11, 1972, pp. 860–863.

*Primary Examiner*—John A. Parrish

[57] ABSTRACT

This invention relates to a process for preparing structural components which comprises preparing a slurry containing a hydraulic binding agent, water, additives and an organo(poly)siloxane of the general formula

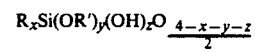

$$R_x Si(OR')_y (OH)_z O_{\frac{4-x-y-z}{2}}$$

where at least 10 percent of the number of R radicals are the same or different alkyl radicals having at least 4 carbon atoms per radical and the other radicals when present are alkyl radicals having from 1 to 3 carbon atoms per radical and/or phenyl radicals, R' represents the same or different alkyl radicals having from 1 to 4 carbon atoms per radical, x is 0, 1, 2 or 3, with an average of from 0.9 to 1.8, y is 0, 1, 2 or 3, with an average of 0.01 to 2.0 and z is 0, 1, 2 or 3, with an average of from 0.00 to 0.5, with the proviso that the sum of x+y+z may not exceed 3.5, molding the slurry and thereafter exposing the molded slurry to aqueous steam.

9 Claims, No Drawings

4,394,335

PROCESS FOR PREPARING STRUCTURAL COMPONENTS

The present invention relates to a process for preparing structural components and more particularly to a process for preparing structural components by incorporating an organopolysiloxane onto a slurry containing a hydraulic binding agent, then molding the slurry and thereafter exposing the molded slurry to aqueous steam.

BACKGROUND OF THE INVENTION

It has been known heretofore that building blocks or structural components may be prepared by exposing them to aqueous steam to enhance bonding or hardening of the materials used to prepare the blocks or structural components. This process is known as the "hydrothermal process" and is especially useful in manufacturing steam-hardened, low-weight gas concrete having hydrophobic properties. Also, German patent application No. 3,004,346 to Internationella Siporex AB, published Aug. 28, 1980, discloses that silicone oil can be added to a slurry consisting of a hydraulic binding agent, water and additives before it is molded and then exposed to aqueous steam.

It has been found that with the same amount of organopolysiloxane, building blocks or structural components prepared in accordance with the present invention and bonded or hardened with the aid of aqueous steam, exhibit much improved hydrophobicity in which the hydrophobicity is more evenly distributed on the surface or within the structure of the building blocks or structural components. Moreover, the pores are better distributed throughout the structural components and subsequent to bonding or hardening they can be more easily coated, for example with bitumen, than building blocks or structural components prepared in accordance with German patent application No. 3,004,346 containing silicone oil and then bonded or hardened with the aid of aqueous steam.

Therefore, it is an object of the present invention to provide a process for preparing structural components having improved hydrophobic properties. Another object of this invention is to provide structural components having improved hydrophobicity which is more evenly distributed throughout the structure as well as on the surface. Still another object of this invention is to provide a better distribution of pores throughout the structural components. A further object of this invention is to provide a process for preparing components which are easily coated.

SUMMARY OF THE INVENTION

The foregoing objects and others which will become apparent from the following description are accomplished, generally speaking, by providing a process for preparing structural components which comprises preparing a slurry containing a hydraulic binding agent, water, additives and an organopoly-siloxane, in which at least a portion of the organopolysiloxane consists of a compound having the general formula $$R_xSi(OR')_y(OH)_zO_{\frac{4-x-y-z}{2}}$$

where at least 10 percent of the number of R radicals are the same or different alkyl radicals having at least 4 carbon atoms per radical and the other R radicals, when present are alkyl radicals having from 1 to 3 carbon atoms, preferably methyl and/or phenyl radicals, R' represents the same or different alkyl radicals having from 1 to 4 carbon atoms per radical, x is 0, 1, 2 or 3, with an average of from 0.9 to 1.8, y is 0, 1, 2 or 3, with an average of from 0.01 to 2.0, and z is 0, 1, 2 or 3, with an average of from 0.00 to 0.5, with the proviso that the sum of x+y+z may not exceed 3.5, molding the resultant slurry and thereafter exposing the molded slurry to aqueous steam.

DETAILED DESCRIPTION OF THE INVENTION

It is preferred that the R radicals have at least 8 and no more than 18 carbon atoms per radical. Examples of R radicals having at least 4 carbon atoms per radical are the n-butyl, sec-butyl, cyclohexyl, 2-ethylhexyl, n-octyl, lauryl and stearyl radicals as well as hexyl, methylcyclohexyl and octadecyl radicals.

Although x may have an average value of from 0.9 to 1.8, it is preferred that x have an average value which does not exceed 1.5.

The radicals represented by $R^1$ may be methyl, ethyl, n-propyl, n-butyl, sec-butyl or tert-butyl radicals, or mixtures of such radicals.

It is preferred that the organopolysiloxane having the general formula $$R_xSi(OR')_y(OH)_zO_{\frac{4-x-y-z}{2}}$$

have a viscosity of at least 300 mm$^2$.s$^{-1}$ at 250° C., and more preferably of from 5 to 30 mm$^2$.s$^{-1}$ at 25° C.

Examples of suitable organopolysiloxanes having the above cited formula are

RSi(OR'$_2$)O[SiR(OR')O]$_a$Si(OR')$_2$R and
RSi(OR')$_2$OSiRO[SiR(OR')$_2$]OSiR(OR'-
)OSi(OR')$_2$R, where R and R' are the same as above and a is 0 or 1.

Structural components prepared in accordance with this invention may be any building blocks or components which could be bonded or hardened heretofore by the action of aqueous steam. Gas concrete blocks are preferred. Other examples of building blocks or structural components which can be prepared pursuant to the process of this invention are those made from foamed concrete and calcium-silicate ["lime-sand"]. The hydraulic binding agent used in preparing such building blocks or structural components is generally calcium [Ca O, or Ca (OH$_2$)] or Portland cement. Examples of additives are sand, vermiculite, perlite, gravel, sawdust, excelsior ["wood wool"], asbestos, agents which retard bonding, such as gluconic acid, calcium gluconate, vinylpolymers, pigments, such as oxide dyes and gasgenerating agents such as aluminum powder.

Preferably, the organopolysiloxane having the general formula $$R_xSi(OR')_y(OH)_zO_{\frac{4-x-y-z}{2}}$$

is employed in an amount of from 0.01 to 5.0 percent by weight and more preferably in an amount of from 0.05 to 1.0 percent by weight, based on the total weight of the dry hydraulic bonding agent and the dry additives.

The organopolysiloxane or a mixture of at least two such organopolysiloxane used in accordance with this invention may be mixed in any sequence with the other components. Thus, the organopolysiloxane can be incorporated in a slurry consisting of a hydraulic bonding agent, water and additives at any time prior to the molding step. However, it is preferred that the organopolysiloxane used in accordance with this invention be initially mixed with a portion of the components from which the slurry is to be made, for example with the water or with the water and the lime, and then the remainder of the other components of the slurry are then added to the mixture thus formed.

In order to achieve a better distribution of the organopolysiloxane with the other components, the organopolysiloxane can be mixed with a water-miscible solvent, such as alcohols having from 1 to 3 carbon atoms, such as for example, isopropanol or dioxane.

In order to achieve a better distribution of the organopolysiloxane with the other components of this composition, the organopolysiloxane may also be mixed with surfactants such as alkali metal alkyl sulfates, alkylsulfonates or polyglycols, or protective colloids such as polyvinyl alcohol, or it can be incorporated in a mixture consisting of a surfactant and a protective colloid, such as for example, a mixture of sodium lauryl sulfate and polyvinyl alcohol.

In addition to the hydraulic bonding agent, water, additives and an organopolysiloxane, the slurry may also contain metal compounds which act as catalysts in promoting hydrolysis, such as organotin compounds, for example, dibutyltin dilaurate or titanium butylate. Before it is mixed with the other components, the organopolysiloxane of this invention may be mixed with an inorganic acid, for example hydrochloric acid or a carboxylic acid.

The slurry may be molded and exposed to aqueous steam to bond or harden the slurry by any method which has been used or could have been used heretofore in preparing structural components in the presence of aqueous steam.

In the following examples all percentages are by weight unless otherwise specified.

EXAMPLE 1

To a mixture consisting of 90 percent by weight of $SiO_2$ sand and 10 percent by weight of fine white lime (CaO), is added an organosiloxane having the formula $$RSi(OCH_3)_2O_{0.5}$$

in the amount shown in the following table, where 70 percent of the number of R radicals are methyl radicals and 30 percent of the number of the R radicals are 2-ethylhexyl radicals, followed by the addition of the amount of water necessary to slake the lime and form a mixture which is sufficiently moist for pressing. The mixture so obtained is used in preparing castings which are hardened under aqueous steam.

The following table shows the amount of water absorbed by the calcium-silicate blocks prepared in the manner described above, after having been stored in water for 24 hours. Water absorption is indicated in percent by weight, based on the dry weight of the calcium-silicate.

TABLE

| Percent by weight of organosiloxane based on the total weight of sand and CaO | Percent by weight of water absorption |
|---|---|
| 0 | 16.9 |
| 0.1 | 9.3 |
| 0.2 | 7.5 |
| 0.4 | 3.0 |

EXAMPLE 2

About 58.5 kg of wet quartz sand having an $SiO_2$ content of 95 percent by weight based on the weight of the sand, is ground in a ball mill until a flowable slurry is obtained. To this slurry is first added 5.0 kg of Portland cement, then 24.5 kg of unslaked lime having a CaO-content of 86 percent by weight, and thereafter 12.0 kg of so-called "scraping mud" (residue containing the indicated components remaining after the molding process). A sufficient amount of water is added to provide a total water weight of 41.5 kg, then 22.2 kg of the organosiloxane having the formula of Example 1, and finally 0.14 kg of fine aluminum powder having an Al content of 93 percent by weight. The slurry is then mixed for 6 minutes at 35° C. and the mixture obtained is allowed to stand for 90 minutes.

About 0.45 kg of the mixture thus obtained is added to a mixture prepared above, except that 58.5 kg of water is added instead of the 41.5 kg of water and the organosiloxane is omitted. The resultant mixture is molded into castings and the castings hardened for 11 hours under an aqueous steam pressure of 11.8 bar.

The gas concrete hardened has the following properties:

| | |
|---|---|
| Compression strength: | $2.84 N/mm^2$ |
| Weight by volume: | $400 kg/m^3$ |
| Shrinkage: | $0.40^0/00$ |
| Water absorption: | 7.2 percent by volume |

COMPARISON EXAMPLE

The method described in Example 2 is repeated, except that the 0.45 kg mixture containing the organosiloxane is omitted. About 58.5 kg of quartz sand is ground wet in a ball mill until a flowable slurry is obtained. To the flowable slurry are added first 5.0 kg of Portland cement, then 24.5 kg of unslaked lime, and then 12.0 kg of "scraping mud" (residue containing the indicated components which is left over after the molding process). A sufficient amount of water is added to ensure that the total weight of the water is 58.5 kg and finally, 0.14 kg of fine aluminum powder. The resultant mixture is poured into molds and the castings are hardened in accordance with the procedure described in Example 2.

The gas concrete obtained has the same characteristics as that obtained in Example 2, except that its water absorption is about 15 percent by volume.

What is claimed is:

1. A process for preparing structural components which comprises forming a slurry containing a hydraulic bonding agent, water, additives and an organopolysiloxane in which at least a portion of the organopolysiloxane consists of at least one compound of the formula

where at least 10 percent of the number of the R radicals are alkyl radicals having at least 4 carbon atoms per radical and the other R radicals are selected from the group consisting of alkyl radicals having from 1 to 3 carbon atoms per radical, phenyl radicals and mixtures thereof, R' is an alkyl radical having from 1 to 4 carbon atoms per radical, x is 0, 1, 2 or 3, with an average of from 0.9 to 1.8, y is 0, 1, 2 or 3, with an average of from 0.01 to 2.0, and z is 0, 1, 2 or 3, with an average 0.00 to 0.5, with the proviso that the sum of $x+y+z$ may not exceed 3.5, molding the slurry and thereafter exposing the molded slurry to aqueous steam.

2. The process of claim 1, wherein x does not exceed 1.5.

3. The process of claim 1 or 2, wherein the alkyl radicals represented by R have at least 8 carbon atoms per radical.

4. The process of claim 1 or 2, wherein the organopolysiloxane has a viscosity which does not exceed 300 $mm^2.s^{-1}$ at 25° C.

5. The process of claim 1 or 2, wherein the organopolysiloxane is mixed with a portion of the components of the slurry consisting of a hydraulic bonding agent, water and additives and the resultant mixture is then mixed with the remaining portion of the components of the slurry.

6. The process of claim 1 or 2, wherein the organopolysiloxane is mixed with an alcohol having from 1 to 3 carbon atoms.

7. The process of claim 1 or 2, wherein the organopolysiloxane is mixed with a compound selected from the group consisting of a surfactant, a protective colloid and a mixture containing a surfactant and a protective colloid.

8. The process of claim 1 or 2, wherein the organopolysiloxane is mixed with a metal compound which acts as a hydrolysis catalyst.

9. The process of claim 1 or 2, wherein the organopolysiloxane is mixed with an acid selected from the group consisting of an inorganic acid and a carboxylic acid before it is mixed with the other components of the slurry.

* * * * *